(12) United States Patent
Horiuchi et al.

(10) Patent No.: US 10,323,162 B2
(45) Date of Patent: Jun. 18, 2019

(54) ABRASIVE MATERIAL

(71) Applicant: MITSUI MINIG & SMELTING CO., LTD., Tokyo (JP)

(72) Inventors: Mikimasa Horiuchi, Tokyo (JP); Ryutaro Kuroda, Tokyo (JP); Yasuhide Yamaguchi, Tokyo (JP)

(73) Assignee: Mitsui Minig & Smelting Co., Ltd., Tokyo (JP)

( * ) Notice: Subject to any disclaimer, the term of this patent is extended or adjusted under 35 U.S.C. 154(b) by 230 days.

(21) Appl. No.: 15/410,942

(22) Filed: Jan. 20, 2017

(65) Prior Publication Data

US 2017/0130097 A1    May 11, 2017

Related U.S. Application Data

(62) Division of application No. 13/513,917, filed as application No. PCT/JP2010/067080 on Sep. 30, 2010, now abandoned.

(30) Foreign Application Priority Data

Dec. 11, 2009   (JP) .................. 2009-282084

(51) Int. Cl.
*B24D 3/00*  (2006.01)
*C09K 3/14*  (2006.01)
(Continued)

(52) U.S. Cl.
CPC ............. *C09G 1/02* (2013.01); *B24B 7/10* (2013.01); *C09K 3/1409* (2013.01); *C08K 2003/2262* (2013.01)

(58) Field of Classification Search
USPC ....................................... 51/309
See application file for complete search history.

(56) References Cited

U.S. PATENT DOCUMENTS 4,551,254 A   11/1985   Imada et al.
6,193,790 B1   2/2001   Tani
(Continued)

FOREIGN PATENT DOCUMENTS

JP   06092639   4/1994
JP   7-245109   9/1995
(Continued)

OTHER PUBLICATIONS http://www.sciencedirect.com/science/article/pii/0378775394801029; Askar et al.
(Continued)

*Primary Examiner* — James E McDonough
(74) *Attorney, Agent, or Firm* — Roberts & Roberts, LLP

(57) ABSTRACT

The present invention provides an abrasive material capable of polishing difficult-to-polish silicon carbide at a high degree of surface precision. The present invention relates to an abrasive material including manganese dioxide particles having a non-needle-like shape possessing a ratio of the longitudinal axis to the transverse axis of the particles observed with a scanning electron microscope of 3.0 or less. The abrasive material is preferable if the average particle size $D_{SEM}$ of the longitudinal axis of the observed particles is 1.0 μm or less, and if the particle size $D_{50}$ of the volume-based cumulative fraction of 50% in laser diffraction/scattering particle size distribution measurement is 2.0 μm or less.

18 Claims, 1 Drawing Sheet

(51) Int. Cl.
    *C09G 1/02*     (2006.01)
    *B24B 7/10*     (2006.01)
    *B24D 3/02*     (2006.01)
    *B24D 11/00*     (2006.01)
    *B24D 18/00*     (2006.01)
    *C08K 3/22*     (2006.01)

(56) References Cited

U.S. PATENT DOCUMENTS

| | | | |
|---|---|---|---|
| 8,157,877 | B2 | 4/2012 | Ikeda et al. |
| 2002/0098701 | A1* | 7/2002 | Hasegawa ............... B24B 37/24 |
| | | | 438/692 |
| 2009/0098454 | A1* | 4/2009 | Shimamura ............ C01G 45/02 |
| | | | 429/164 |
| 2009/0165395 | A1 | 7/2009 | Ikeda et al. |
| 2012/0108064 | A1* | 5/2012 | Suzuki ................. B24B 37/044 |
| | | | 438/689 |
| 2012/0240479 | A1* | 9/2012 | Doi ....................... B24B 37/044 |
| | | | 51/309 |

FOREIGN PATENT DOCUMENTS

| | | |
|---|---|---|
| JP | 9-22888 | 1/1997 |
| JP | 10-60415 | 3/1998 |
| JP | 2000-349052 | 12/2000 |
| JP | 2001-35818 | 2/2001 |
| JP | 2002-261051 | 9/2002 |
| JP | 2008-210746 | 9/2008 |
| WO | 2007/069488 A1 | 6/2007 |

OTHER PUBLICATIONS

Supplementary European Search Report, EP 10835761.7, dated Apr. 12, 2017.

* cited by examiner

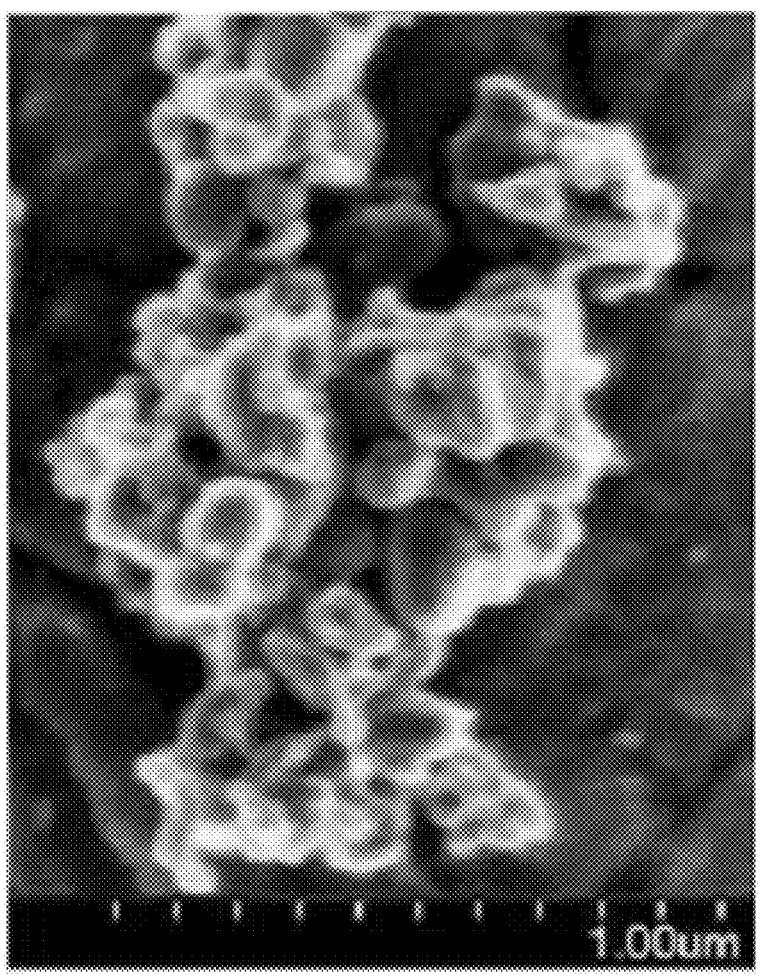

ABRASIVE MATERIAL

CROSS REFERENCE TO RELATED APPLICATION

This application is a divisional of and claims the benefit of U.S. patent application Ser. No. 13/513,917 filed on Jun. 5, 2012, which was a U.S. National Phase entry of International Application Number PCT/JP2010/067080 filed Sep. 30, 2010 (WO 2011/070839, published Jun. 16, 2011), and which claims convention priority from Japan patent application number 2009-282084 filed on Dec. 11, 2009.

BACKGROUND OF THE INVENTION

Field of the Invention

The present invention relates to an abrasive material including manganese dioxide, in particular to an abrasive material including manganese dioxide having a specific particle shape suitable for polishing silicon carbide.

Description of the Related Art

Manganese dioxide is produced, for example, through deposition on an anode by electrolysis, and is used in large amounts as a material for alkali manganese battery. Such particles produced by electrolysis are aggregates of needle crystals (see, Patent Document 1 and Patent Document 2), and there is known a technology to pulverize such aggregates to yield fine needle-like particles.

It has also been known to use as an abrasive material the manganese dioxide needle-like particles produced by such a method (Patent Document 3). Such manganese dioxide needle-like particles obtained by electrolysis are aggregates of approximately 0.1 μm in the long axis, and an abrasive material including such needle-like particles of manganese dioxide is said to be excellent in abrasive performance.

As described above, in the fields of battery materials and abrasive materials, manganese dioxide in the form of needle crystals has been considered to be excellent for the purpose of improving the chemical performances. Abrasive materials including manganese dioxide have higher polishing capability than abrasive materials including silicon oxide or cerium oxide, depending on the objects to be polished. For a to-be-polished object such as an object made of tungsten, difficult to polish, an abrasive material including manganese dioxide has been used (Patent Document 4).

Recently, silicon carbide (SiC) has been attracting attention as a substrate material for power electronics semiconductors and white LEDs; however, silicon carbide has an extremely high hardness and is known as a difficult-to-polish material. For example, an attempt to polish silicon carbide is made with an abrasive material including silicon oxide having an excellent abrasive property; however, the polishing rate is not really high, and the obtained degree of surface precision is also not sufficiently satisfactory. Accordingly, there has been strongly demanded a polishing technology which can rapidly polish a difficult-to-polish material such as silicon carbide and can attain a high degree of surface precision.

PRIOR ART DOCUMENTS

Patent Documents

Patent Document 1: Japanese Patent Application Laid-Open No. 7-245109
Patent Document 2: Japanese Patent Application Laid-Open No. 2008-210746
Patent Document 3: Japanese Application Laid-Open No. 10-60415
Patent Document 4: Japanese Application Laid-Open No. 9-22888

SUMMARY OF THE INVENTION

Problems to be Solved by the Invention

The present invention has been achieved against a backdrop of such circumstances as described above, and an object of the present invention is to provide an abrasive material including manganese dioxide having a specific shape, capable of rapidly polishing a difficult-to-polish material such as silicon carbide and capable of achieving a high degree of surface precision.

Means for Solving the Problems

The present inventor has found out that, in the case where a difficult-to-polish material having a high hardness such as silicon carbide is polished with manganese dioxide, the intensity of chemical action of manganese dioxide varies depending the axial direction of the manganese dioxide particle; an abrasive material including manganese dioxide composed of needle-shaped particles tends to result in unevenness in polishing rate and results in a abrasive treatment in which unevenness also occurs in the degree of surface precision. Consequently, the present inventors have thought up the present invention by discovering, on the basis of such a finding as describe above, that an abrasive material including manganese dioxide composed of particles being specific in shape dramatically improves the abrasive performance, and in particular, allows the roughness of the polished surface to be extremely small.

The present invention relates to an abrasive material including manganese dioxide particles having a non-needle-like shape in which the ratio of the longitudinal axis to the traverse axis of the particles as observed with a scanning electron microscope is 3.0 or less. Manganese dioxide tends to be needle crystals and has a tendency to form a large number of needle-shaped particles; however, manganese dioxide composed of non-needle-shaped particles is provided with an excellent abrasive performance, can rapidly polish a difficult-to-polish material such as silicon carbide and can achieve a high degree of surface precision.

The abrasive material according to the present invention includes non-needle-shaped particles, and the shape of the particles is nearly spherical. Specifically, when the lengthwise axis as observed with a scanning electron microscopes (SEM) is defined as the longitudinal axis, and the axis perpendicular to the lengthwise axis is defined as the transverse axis, the ratio of the longitudinal axis to the transverse axis (longitudinal axis/transverse axis) is 3.0 or less and is preferably 2.0 or less. The smaller the ratio of the longitudinal axis to the transverse axis is, the smaller the polished surface roughness Ra is, the more the degree of surface precision of the polished surface is improved, and the larger the polishing rate is. The ratio of the longitudinal axis to the transverse axis is more preferably 1.0 to 1.5.

In the abrasive material according to the present invention, the average particle size $D_{SEM}$ of the longitudinal axis (lengthwise axis) of the particles observed with a scanning electron microscope is 1.0 μm or less. The smaller the average particle size of the abrasive material is, the smaller the polished surface roughness Ra tends to be. The average particle size $D_{SEM}$ is more preferably 0.5 µm or less and furthermore preferably 0.2 µm or less.

In the abrasive material according to the present invention, the particle size $D_{50}$ of the volume-based cumulative fraction of 50% in laser diffraction/scattering particle size distribution measurement is preferably 2.0 µm or less. When the morphology of the abrasive material is such that fine non-needle-shaped particles are aggregated to some extent, the abrasive material tends to be excellent in abrasive performance. The average particle size $D_{SEM}$ of the primary particles composing the abrasive material is preferably 1.0 µm or less; moreover, there is such a tendency that the smaller the size of the secondary particles is, the more excellent the abrasive performance is. The particle size $D_{50}$ of the volume-based cumulative fraction of 50% in laser diffraction/scattering particle size distribution measurement is preferably 2.0 µm or less, more preferably 1.0 µm or less and furthermore preferably 0.8 µm or less.

In the abrasive material according to the present invention, the specific surface area thereof is preferably 20 $m^2/g$ or more. When the specific surface area is less than 20 $m^2/g$, the reactivity with the object being polished is degraded, and it tends to take a longer polishing time to complete the intended abrasive treatment.

In the abrasive material according to the present invention, the crystal structure of manganese dioxide is of the γ-type or of the β-type. This is because manganese dioxide having the γ-type or the β-type crystal structure is extremely high in its oxidation effect and facilitates achievement of excellent abrasive performance.

The abrasive material including manganese dioxide having the γ-type crystal structure in the present invention can be realized by a production method including a dry pulverization step of dry pulverizing the γ-type manganese dioxide deposited on the surface of an anode by electrolytic reaction. The manganese dioxide obtained by electrolytic reaction has a larger fraction of needle-shaped particles; however, dry pulverization of the needle-shaped particles enables the production of the manganese dioxide composed of non-needle-shaped particles. In the dry pulverization step, for example, the following pulverizing machines can be used: a jet mill in which mutual collision of the high pressure air flows pulverizes the particles; an atomizer in which the shear force between a rotating blade and a screen pulverizes the particles; and a roller mill in which the particles are pulverized between two rollers. In particular, the jet mill is a preferable pulverizing machine because the jet mill has a high capability of fine pulverization, and additionally is excellent in the capability of deforming the needle-shaped particles into nearly spherical particles. In the dry pulverization step, equipment of an air classifier or a sieve enables the preparation of an abrasive material having a uniformized particle size. On the other hand, when manganese dioxide having a larger fraction of needle-shaped particles is wet pulverized, the particles tend to be pulverized preferentially in a specific direction, and thus tend to be pulverized into rod-like shapes or needle-like shapes. When particles having such shapes are present in a large proportion, the fluidity on the polishing surface is unsatisfactory, and accordingly the to-be-polished surface tends not to be uniformly polished or the causes for the occurrence of scratches are offered. Moreover, in wet pulverization, the heat due to the impact force of the pulverization in the presence of water causes the dissolution and precipitation of manganese dioxide and hence extremely long needle crystals tend to grow. Dry pulverization does not grow needle-shaped particles, and enables pulverization into non-needle-shaped particles, namely, nearly spherical particles.

The abrasive material including manganese dioxide having the β-type crystal structure in the present invention can be realized by a production method of an abrasive material including a heating step of heating in a hot atmosphere set at 200° C. to 600° C. the γ-type manganese dioxide deposited on the surface of an anode through electrolytic reaction, and a dry pulverization step of dry pulverizing the heat treated manganese dioxide. The manganese dioxide deposited on the surface of an anode through electrolytic reaction has the γ-type crystal structure; however, heating of the manganese dioxide having the γ-type crystal structure in the hot atmosphere set at 200° C. to 600° C. enables the conversion thereof into the manganese dioxide having the β-type crystal structure. Further application of the aforementioned dry pulverization to the manganese dioxide having the β-type crystal structure obtained in the heating step enables the preparation of the abrasive material of the present invention including the manganese dioxide having the β-type crystal structure. When the heating temperature is lower than 200° C., the γ-type crystal structure tends to remain unchanged. When the heating temperature is higher than 600° C., the transformation from manganese dioxide ($MnO_2$) to dimanganese trioxide ($Mn_2O_3$) tends to occur.

Effect of the Invention

As described above, the abrasive material according to the present invention enables polishing of difficult-to-polish silicone carbide at an extremely rapid rate and with a high degree of surface precision.

BRIEF DESCRIPTION OF THE DRAWING

FIG. 1 is a scanning electron micrograph of Example 1 (magnification: 100,000).

EMBODIMENTS FOR CARRYING OUT THE INVENTION

The best mode for carrying out the present invention is described with reference to Examples and Comparative Examples.

Example 1

In Example 1, manganese dioxide was deposited on an anode by electrolysis of an aqueous solution of manganese sulfate, and the thus deposited manganese dioxide was used. The manganese dioxide obtained by electrolysis was disintegrated with a disintegrator (Atomizer, manufactured by Powrex Corp.), then pulverized with a jet mill (PJM-200SP, manufactured by Nippon Pneumatic Mfg. Co., Ltd.) (pulverization condition: pulverization object was pulverized at a rate of 4 kg/hour, by jetting compressed air at 0.05 MPa), and thus, an abrasive material in which the particle size $D_{50}$ of the volume-based cumulative fraction of 50% in laser diffraction/scattering particle size distribution measurement was 0.45 µm was produced. The crystal structure of the obtained manganese dioxide was found to be of the γ-type by examination with X-ray diffraction.

The particle shape of the abrasive material of Example 1 was examined with a scanning electron microscope (FE-SEM, S-4800, manufactured by Hitachi Ltd.). FIG. 1 shows the observed microgram. The particles in the observed microgram were found to be non-needle-like and nearly spherical. The lengths of the long axis and the lengths of the short axis perpendicular to the long axis were measured for 100 particles observed to be primary particles, with the aid of the observed microgram at a magnification of 100,000 based on the FE-SEM; thus, the average length of the long axis and the average length of the short axis were observed to be 0.16 µm and 0.11 µm, respectively; and the ratio of the long axis length to the short axis length of each of the particles was calculated to be 1.00 to 1.25. The specific surface area of the abrasive material of Example 1 was measured and observed to be 40 m$^2$/g on the basis of the BET method (according to 6.2 Flow Method, (3.5) One Point Method of JIS R 1626-1996 (a specific surface area measurement method of fine ceramic powder based on the gas adsorption BET method); in this measurement, a mixed gas was used which was composed of helium as carrier gas and nitrogen as adsorbate gas).

Next, the results obtained by polishing a silicon carbide single crystal plate with the abrasive material of Example 1 are described. The silicon carbide single crystal plate as the polishing object was a 6H—SiC single crystal of 2 inches in diameter and 250 mm in thickness, and the polishing surface was the on-axis plane (parallel to the wafer surface cut perpendicular to the crystal axis). Before polishing, the surface roughness Ra of the to-be-polished surface of the substrate was measured with an AFM (atomic force microscope, Nanoscope IIIa, manufactured by Veeco Instruments, Inc.) and was observed to be 2.46 nm.

The polishing conditions were as follows: an abrasive material slurry containing 10 wt % of manganese dioxide was used; the abrasive load was set at 190 g/cm$^2$; and the single crystal substrate was placed on an abrasive pad (IC-1000, manufactured by Nitta Haas Inc.) and polished for 180 minutes. After polishing, the polished surface was washed with water to remove the attached slurry and was dried. The surface roughness was measured with an AFM for randomly selected five points on the dried polished surface, and the average Ra was observed to be 0.10 nm. The polishing rate was calculated by measuring the substrate weights before and after polishing, and was observed to be 0.12 µm/hr.

Example 2

Manganese dioxide deposited on an anode under the same electrolysis conditions as in Example 1 was calcined at 450° C. for 1 hour, and the thus obtained manganese dioxide was used in Example 2. The calcined manganese dioxide was disintegrated in the same manner as in Example 1, then pulverized with a jet mill, and thus an abrasive material in which the particle size D$_{50}$ of the volume-based cumulative fraction of 50% in laser diffraction/scattering particle size distribution measurement was 0.58 µm was produced. The crystal structure of the obtained manganese dioxide was found to be of the β-type by examination with X-ray diffraction.

The particle shape of the abrasive material of Example 2 was examined with an FE-SEM in the same manner as in Example 1, and it was revealed that the observed particles were each non-needle-like and nearly spherical, like the particles shown in FIG. 1. The lengths of the long axis and the lengths of the short axis perpendicular to the long axis were measured for 100 particles observed to be primary particles, with the aid of the observed microgram at a magnification of 100,000 based on the FE-SEM; thus, the average length of the long axis and the average length of the short axis were observed to be 0.16 µm and 0.13 µm, respectively; and the ratio of the long axis length to the short axis length of each of the particles was calculated to be 1.00 to 1.67. The specific surface area of the abrasive material of Example 2 was measured and observed to be 40 m$^2$/g on the basis of the BET method.

By using the abrasive material of Example 2, a silicon carbide single crystal plate was polished under the same conditions as in Example 1, and consequently the obtained surface roughness Ra of the polished surface was observed to be 0.17 nm. The polishing rate in Example 2 was observed to be 0.07 µm/hr.

Example 3

In Example 3, manganese dioxide deposited on an anode under the same electrolysis conditions as in Example 1 was used, and the obtained manganese dioxide was twice pulverized with an impact pulverizer composed of a rotating blade and a screen (Beater Mill, manufactured by Retsch Co., Ltd.), to produce an abrasive material. It was an abrasive material that includes manganese dioxide in which the particle size D$_{50}$ of the volume-based cumulative fraction of 50% in laser diffraction/scattering particle size distribution measurement was 0.77 µm. The crystal structure of the obtained manganese dioxide was found to be of the γ-type by examination with X-ray diffraction.

The particle shape of the abrasive material of Example 3 was examined with an FE-SEM in the same manner as in Example 1, and it was revealed that the observed particles were each non-needle-like and nearly spherical, like the particles shown in FIG. 1. The lengths of the long axis and the lengths of the short axis perpendicular to the long axis were measured for 100 particles observed to be primary particles, with the aid of the observed microgram at a magnification of 100,000 based on the FE-SEM; thus, the average length of the long axis and the average length of the short axis were observed to be 0.23 µm and 0.19 µm, respectively; and the ratio of the long axis length to the short axis length of each of the particles was calculated to be 1.00 to 1.52. The specific surface area of the abrasive material of Example 3 was measured and observed to be 41 m$^2$/g on the basis of the BET method.

By using the abrasive material of Example 3, a silicon carbide single crystal plate was polished under the same conditions as in Example 1, and consequently the obtained surface roughness Ra of the polished surface was observed to be 0.10 nm. The polishing rate in Example 3 was observed to be 0.10 µm/hr.

Comparative Example 1

In Comparative example 1, manganese dioxide obtained by electrolysis under the same conditions as in Example 1 was wet pulverized with a pulverizer (Dynomill, pulverizing medium: 0.8 mmϕ zirconia beads, manufactured by Willey A. Bachofen AG Maschinenfabrik) to produce an abrasive material. In the abrasive material of Comparative Example 1, the particle size D$_{50}$ of the volume-based cumulative fraction of 50% in laser diffraction/scattering particle size distribution measurement was observed to be 0.38. The crystal structure of the obtained manganese dioxide was found to be of the γ-type by examination with X-ray diffraction.

The particle shape of the abrasive material of Comparative Example 1 was examined with an FE-SEM in the same manner as in Example 1, and it was verified that the observed particles included a large number of needle-shaped particles. The lengths of the long axis and the lengths of the short axis perpendicular to the long axis were measured for 100 particles observed to be primary particles, with the aid of the observed microgram at a magnification of 100,000 based on the FE-SEM; thus, the average length of the long axis and the average length of the short axis were observed to be 1.45 µm and 0.14 µm, respectively; and the ratio of the long axis length to the short axis length of each of the particles was calculated to be 3.60 to 10.50. The specific surface area of the abrasive material of Comparative Example 1 was measured and observed to be 18 m²/g on the basis of the BET method.

By using the abrasive material of Comparative Example 1, a silicon carbide single crystal plate was polished under the same conditions as in Example 1, and consequently the obtained surface roughness Ra of the polished surface was observed to be 0.56 nm. The polishing rate in Comparative Example 1 was observed to be 0.03 µm/hr.

Comparative Example 2

In Comparative Example 2, a commercially available colloidal silica (Compol 80, manufactured by Fujimi Inc.) was used as an abrasive material. In the abrasive material of Comparative Example 2, the particle size $D_{50}$ of the volume-based cumulative fraction of 50% in laser diffraction/scattering particle size distribution measurement was observed to be 0.10 µm. The particle shape of the abrasive material of Comparative Example 2 was examined with an FE-SEM in the same manner as in Example 1, and it was verified that the observed particles were each nearly spherical. The lengths of the long axis and the lengths of the short axis perpendicular to the long axis were measured for 100 particles observed to be primary particles were measured with aid of the observed microgram at a magnification of 50,000 based on the FE-SEM; thus, the average length of the long axis and the average length of the short axis were observed to be 0.08 µm and 0.08 µm, respectively; and the ratio of the long axis length to the short axis length of each of the particles was calculated to be 1.00 to 1.05.

By using the abrasive material of Comparative Example 2, an abrasive material slurry containing 10 wt % of the abrasive material was prepared. By using the abrasive slurry, an abrasive treatment was performed under the same conditions as in Example 1. Consequently, the obtained surface roughness Ra of the polished surface was observed to be 2.53 nm, and the surface roughness showed little change between before and after polishing. The polishing rate in Comparative Example 2 was observed to be 0.01 µm/hr.

Comparative Example 3

Manganese dioxide obtained under the same electrolysis conditions as in Example 1 was calcined at 850° C. (1 hour), and the thus obtained manganese dioxide was used in Comparative Example 3. The crystal structure of the manganese dioxide having been calcined was identified by X-ray diffraction to be dimanganese trioxide ($Mn_2O_3$). After the calcination, the obtained manganese dioxide was pulverized until the average particle size reached 0.4 µm. The particle shape of the abrasive material of Comparative Example 3 was examined with an FE-SEM in the same manner as in Example 1, and it was verified that the particles were each nearly spherical. The lengths of the long axis and the lengths of the short axis perpendicular to the long axis were measured for 100 particles observed to be primary particles, with the aid of the observed microgram at a magnification of 100,000 based on the FE-SEM; thus, the average length of the long axis and the average length of the short axis were observed to be 0.31 µm and 0.27 µm, respectively; and the ratio of the long axis length to the short axis length of each of the particles was calculated to be 1.00 to 1.47.

The dimanganese trioxide powder having been pulverized was dispersed in purified water so as for the slurry concentration to be 10 wt % to prepare a dimanganese trioxide slurry. By using the slurry, a polishing test was performed under the same conditions as in Example 1. Consequently, the obtained surface roughness Ra of the polished surface was observed to be 2.33 nm, and the surface roughness showed little change between before and after polishing. The polishing rate in Comparative Example 3 was observed to be 0.02 µm/hr.

Comparative Example 4

In Comparative Example 4, oxides of rare earths (trade name: M601; $CeO_2$: 63 wt %, $La_2O_3$: 31 wt %, $Pr_6O_{11}$: 6 wt %, manufactured by Mitsui Mining & Smelting Co., Ltd.) were used as an abrasive material. In the abrasive material of Comparative Example 4, the particle size $D_{50}$ of the volume-based cumulative fraction of 50% in laser diffraction/scattering particle size distribution measurement was observed to be 0.55 µm. The particle shape of the abrasive material of Comparative Example 3 was examined with an FE-SEM in the same manner as in Example 1, and it was verified that the particles were each nearly spherical. The lengths of the long axis and the lengths of the short axis perpendicular to the long axis were measured for 100 particles observed to be primary particles with aid of the observed microgram at a magnification of 50,000 based on the FE-SEM; thus, the average length of the long axis and the average length of the short axis were observed to be 0.31 µm and 0.23 µm, respectively; the ratio of the length of the long axis to the length of the short axis of each of the particles was calculated to be 1.00 to 1.71.

By using the abrasive material of Comparative Example 4, an abrasive material slurry containing 10 wt % of the abrasive material was prepared. By using the abrasive slurry, a polishing was performed under the same conditions as in Example 1. Consequently, the obtained surface roughness Ra of the polished surface was observed to be 2.50 nm, and the surface roughness showed little change between before and after polishing. The polishing rate in Comparative Example 4 was observed to be 0.01 µm/hr.

INDUSTRIAL APPLICABILITY

According to the present invention, it is possible to polish silicon carbide, which is difficult to polish, extremely rapidly at a high degree of surface precision.

What is claimed is:
1. A method of polishing a substrate, comprising:
(a) providing an abrasive material comprising manganese dioxide particles having a non-needle-like shape having a longitudinal axis and a transverse axis, wherein a ratio of the longitudinal axis to the transverse axis of the particles is 3.0 or less; and
(b) polishing a substrate with said abrasive material; wherein the substrate is polished to a surface roughness of 0.17 nm or less.
2. The method according to claim 1, wherein the average particle size $D_{SEM}$ of the longitudinal axis of the manganese dioxide particles is 1.0 µm or less.

3. The method according to claim 1, wherein the particle size $D_{50}$ of the volume-based cumulative fraction of 50% in laser diffraction/scattering particle size distribution measurement is 2.0 μm or less.

4. The method according to claim 1, wherein specific surface area of the abrasive material is 20 m²/g or more.

5. The method according to claim 1, wherein the crystal structure of manganese dioxide is of the γ-type.

6. The method according to claim 1, wherein the crystal structure of manganese dioxide is of the β-type.

7. The method according to claim 5, wherein the manganese dioxide particles have been formed by a dry pulverization step of dry pulverizing γ-type manganese dioxide deposited on an anode by electrolysis.

8. The method according to claim 6, wherein the manganese dioxide particles have been formed by a heating step of heating γ-type manganese dioxide deposited on an anode by electrolysis in a hot atmosphere set at 200° C. to 600° C.; and a dry pulverization step of dry pulverizing the heated manganese dioxide.

9. The method according to claim 1, wherein a ratio of the longitudinal axis to the transverse axis of the particles is 1.00 to 1.67.

10. The method according to claim 1, wherein the abrasive material is in the form of a slurry.

11. The method according to claim 1, wherein the substrate comprises silicon carbide.

12. The method according to claim 1, wherein step (b) comprises polishing the substrate at a polishing rate of 0.07 μm/hr or more.

13. A method of polishing a substrate, comprising:
(a) providing an abrasive material comprising manganese dioxide particles having a non-needle-like shape having a longitudinal axis and a transverse axis, wherein a ratio of the longitudinal axis to the transverse axis of the particles is 3.0 or less, wherein the average particle size $D_{SEM}$ of the longitudinal axis of the particles is 1.0 μm or less, and wherein the particle size $D_{50}$ of the volume-based cumulative fraction of 50% in laser diffraction/scattering particle size distribution measurement is 2.0 μm or less; and
(b) polishing a substrate with said abrasive material;
wherein the manganese dioxide particles have been formed by a heating step of heating γ-type manganese dioxide deposited on an anode by electrolysis in a hot atmosphere set at 200° C. to 600° C.; and a dry pulverization step of dry pulverizing the heated manganese dioxide.

14. The method according to claim 13, wherein the abrasive material is in the form of a slurry.

15. The method according to claim 13, wherein the substrate comprises silicon carbide.

16. The method according to claim 13, wherein the specific surface area of the abrasive material is 20 m²/g or more.

17. The method according to claim 13, wherein a ratio of the longitudinal axis to the transverse axis of the particles is 1.00 to 1.67.

18. A method of polishing a substrate, comprising:
(a) providing an abrasive material comprising manganese dioxide particles having a non-needle-like shape having a longitudinal axis and a transverse axis, wherein a ratio of the longitudinal axis to the transverse axis of the particles is 3.0 or less; and
(b) polishing a substrate with said abrasive material;
wherein the crystal structure of manganese dioxide is of the β-type;
wherein the manganese dioxide particles have been formed by a heating step of heating γ-type manganese dioxide deposited on an anode by electrolysis in a hot atmosphere set at 200° C. to 600° C.; and a dry pulverization step of dry pulverizing the heated manganese dioxide.

* * * * *